(12) United States Patent
Barney et al.

(10) Patent No.: US 8,404,342 B2
(45) Date of Patent: Mar. 26, 2013

(54) CHITOSAN FILMS WITH REDUCED SHRINKAGE AND LAMINATES MADE THEREFROM

(75) Inventors: Nathaniel A. Barney, Wilmington, DE (US); Mark Gary Weinberg, Wilmington, DE (US); Bryan Benedict Sauer, Boothwyn, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 353 days.

(21) Appl. No.: 12/429,530

(22) Filed: Apr. 24, 2009

(65) Prior Publication Data

US 2010/0273383 A1 Oct. 28, 2010

Related U.S. Application Data

(63) Continuation-in-part of application No. 11/593,958, filed on Nov. 7, 2006.

(60) Provisional application No. 60/734,326, filed on Nov. 7, 2005.

(51) Int. Cl.
*B32B 5/16* (2006.01)
*D03D 25/00* (2006.01)
*D04H 13/00* (2006.01)

(52) U.S. Cl. ......... 428/331; 428/323; 442/181; 442/327

(58) Field of Classification Search .................. None
See application file for complete search history.

(56) References Cited

U.S. PATENT DOCUMENTS

| | | | |
|---|---|---|---|
| 2,040,880 A | 5/1936 | Rigby | |
| 4,515,761 A | 5/1985 | Plotzker | |
| 5,015,293 A | 5/1991 | Mayer et al. | |
| 2005/0181024 A1 | 8/2005 | Sabesan | |
| 2007/0196404 A1 | 8/2007 | Howard, Jr. et al. | |
| 2009/0004715 A1 | 1/2009 | Trimbur et al. | |

OTHER PUBLICATIONS

Ruiz Hitzky et al, Functional biopolymer nanocomposites based on layered solids, 2005, Journal of Materials Chemistry, 15, p. 3650-3662.*

Ruiz-Hitzky et al, An Introduction to Bio-nanohybrid Materials, 2008, Bio-inorganic Hybrid Nanomaterials, pp. 1-40.*

Darder et al, Microfibrous Chitosan-Sepiolite Nanocomposites, 2006, Chem. Mater., 18, 1602-1610.*

Xu et al, Chitosan/Clay Nanocomposite Film Preparation and Characterization, 2005, Journal of Applied Polymer Science, vol. 99, 1684-1691.*

Darder et al, Biopolymer-Clay Nanocomposites Based on Chitosan Intercalated in Montmorillonite, 2003, Chem. Mater., 15, 3774-3780.*

Guide to the Selection of Chemical and Biological Decontamination Equipment for Emergency First Responders, U.S. Department of Justice, Office of Justice Programs, National Institute of Justice, Law Enforcement and Corrections Standards and Testing Program, NIJ Guide, 103-200, vol. 1, Oct. 2001.

(Continued)

*Primary Examiner* — Monique Jackson
(74) *Attorney, Agent, or Firm* — Kevin S. Dobson

(57) ABSTRACT

Inclusion of a needle structured sepiolite clay in a chitosan film in an amount of about 0.5 weight percent to about 8 weight percent was found to reduce shrinkage of the film. The clay is processed into a substantially dispersed form. Laminates fabricated from this chitosan film including dispersed sepiolite clay can be used in making a variety of finished articles that can be used to provide protection from hazardous chemical and biological agents.

13 Claims, 3 Drawing Sheets

OTHER PUBLICATIONS

Hung, et al., A review on polymer nanofibers for electrospinning and their applications in nanocomposites, Composites Science and Technology 63 (2003) 2223-2253.

Cohen et al., Coating Processes, Kirk-Othmer Encyclopedia of Chemical Technology, John Wiley 7 Sons, 5th Ed (2004), vol. 7, pp. 1-35.

Brzezinski et al., Structure and Properties of Microporous Polyurethane Membranes Designed for Textile-Polymeric Composite Systems, Fibers & Textiles in Eastern Europe, Jan. / Dec. 2005, vol. 13, No. 6(54).

* cited by examiner

CHITOSAN FILMS WITH REDUCED SHRINKAGE AND LAMINATES MADE THEREFROM

This application is a Continuation in Part claiming priority to U.S. Provisional Application No. 60/734,326 filed Nov. 7, 2005 and U.S. National application Ser. No. 11/593,958 filed Nov. 7, 2006.

TECHNICAL FIELD

The present invention relates to chitosan films with reduced shrinkage and laminates prepared in part from continuous chitosan films. In various embodiments, the laminates are useful for fabrication as a protective article and are preferably substantially impermeable to hazardous chemical and biological agents, but sufficiently permeable to water vapor that, if worn as protective apparel, the apparel is both protective and comfortable to wear.

BACKGROUND

There is a growing need for structures that provide personal protection against toxic chemical and biological agents. It is known to devise structures that are impermeable to toxic chemical vapors and liquids, but, when used as apparel, such structures are typically also hot, heavy and uncomfortable to wear.

The degree of comfort offered by apparel worn as a protective suit is significantly affected by the amount of water vapor that can permeate through the fabric from which the suit is made. The human body continuously perspires water as a method for controlling body temperature. When a protective fabric hinders the loss of water vapor from the body, the transpirational cooling process is hindered, which leads to personal discomfort. When a protective suit allows little or no loss of water vapor, extreme heat stress or heat stroke can result in a short period of time. Hence, it is desirable that, in addition to offering the highest levels of protection against toxic chemicals and liquids, a practical chemical and biological protective suit has relatively high water vapor transmission rates. It is also desirable that the appropriate protective structure be relatively light in weight and offer the same level of protection over a long period of time.

Co-pending U.S. patent application Ser. No. 10/883,105 discloses ballistic fabric articles and protective gear comprising aramid, polybenzazole or high performance polyethylene fibers treated with a solution containing a chitosan agent to render the articles antimicrobial, thereby preventing the development of odor, and fungal and bacterial growth. The chitosan agent can be applied to the article directly, to the fiber or as a fabric finish.

In co-pending U.S. patent application Ser. No. 11/593,958, selectively permeable laminates that contain a continuous chitosan film and that can be used in articles for personal protection, providing improved wearer comfort compared with impermeable articles are disclosed.

There remains a need for chitosan films with reduced shrinkage for use in structures including laminates.

SUMMARY OF THE INVENTION

One aspect of the present invention is a method for reducing the shrinkage of a continuous chitosan film having an original length, comprising including in the chitosan film a needle structured clay in an amount from about 0.5 weight percent to about 10 weight percent based on the weight of the film, provided that, when the needle structured clay is present in an amount of about 1% or less, the clay is purified prior to including the clay in the chitosan film, and wherein the needle structured clay is substantially dispersed.

Another aspect of the present invention is a method of preparing a film comprising:
a) casting a mixture comprising chitosan and a needle-structured clay, wherein the needle-structured clay is substantially dispersed, onto a substrate to form a continuous film wherein the chitosan is at least about 51 weight percent and the clay is from about 0.5 weight percent to about 10 weight percent of the film weight after drying, provided that when the needle-structured clay is present in an amount of about 1% or less, the clay is purified; and
b) drying the film;
wherein the film, after removal from a substrate on which is it cast, has reduced shrinkage as compared to a chitosan film not containing the needle structured clay.

A further aspect of the present invention is a film, having an original length, comprising at least about 51 weight percent chitosan and a needle-structured clay in an amount from about 0.5 weight percent to about 10 weight percent, provided that when the needle structured clay is present in an amount of about 1% or less, the clay is purified prior to including in the chitosan film, and wherein the needle structured clay is substantially dispersed. Also disclosed is a structure comprising said film.

Another aspect of the present invention is a structure comprising at least one layer of fabric and a chitosan film comprising at least about 51 weight percent chitosan and sodium montmorillonite clay in an amount from about 0.5 weight percent to about 10 weight percent based on the weight of the film, wherein the sodium montmorillonite clay is substantially dispersed.

These and other aspects of the present invention will be apparent to one skilled in the art in view of the following description and the appended claims.

DETAILED DESCRIPTION

Figure 1A:
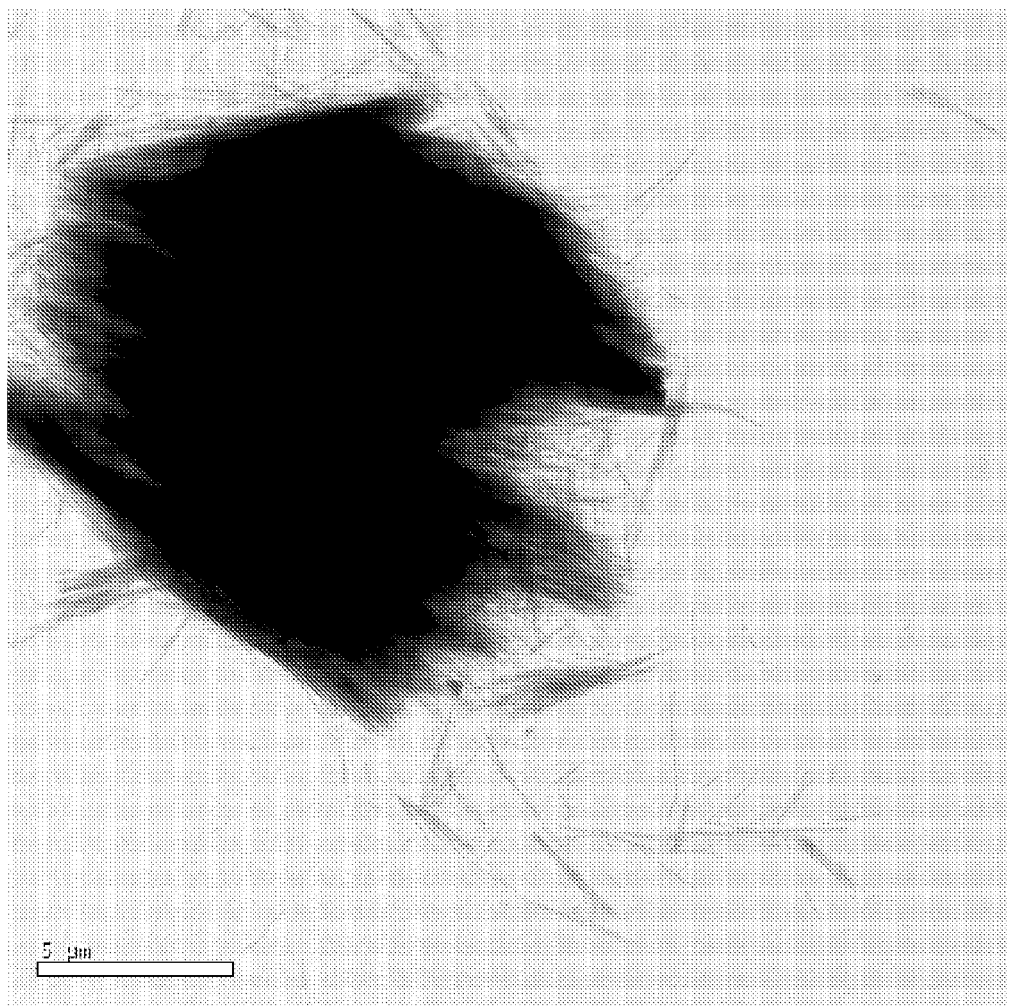
FIG. 1 is an electron micrograph of as-received sepiolite (A), and sepiolite following purification (B).

The term "film" as used herein means a thin but discrete structure that moderates the transport of species in contact with it, such as gas, vapor, aerosol, liquid and/or particulates. A film may be chemically or physically homogeneous or heterogeneous. Films are generally understood to be less than about 0.25 mm thick.

The term "sheet" or "sheeting" as used herein means a film that is at least 0.25 mm thick.

Unless otherwise stated or apparent by the particular context, the term "chitosan" as used herein includes chitosan-based moieties including chitosan itself, chitosan salts, and chitosan derivatives.

The term "chitosan film" as used herein means a film that contains at least one chitosan-based moiety wherein the total of chitosan-based moieties is in the amount of at least about 51% by weight.

The term "nonporous" as used herein denotes a material or surface that does not allow the passage of air other than by diffusion.

The term "continuous chitosan film" as used herein means a chitosan film having at least one nonporous surface.

The term "permeable" as used herein means allowing liquids or gases to pass or diffuse through.

The term "selectively permeable" as used herein means allowing passage of certain species but acting as a barrier to others.

The term "laminate" as used herein means a material comprising two or more parallel layers of material that are at least partially bonded to each other.

The term "substrate" as used herein means the material onto which a film is formed from solution.

The term "work device" as used herein denotes a substrate which is used only for film formation and does not subsequently become part of a laminate.

The term "soluble" as used herein denotes a material that forms a visibly transparent solution when mixed with a specified solvent. For example, a water-soluble material forms a transparent solution when mixed with water, while a water-insoluble material does not.

The term "chitosan solution" as used herein indicates that at least one chitosan moiety is dissolved in the indicated solvent. However, materials that are insoluble in the indicated solvent may also be present.

The term "(in)solubilize" as used herein means to render a material (in)soluble in a specified solvent.

The term "harmful to human health" as used herein means causing injury to humans as a consequence of acute or chronic exposure through dermal contact, ingestion, or respiration.

The term "shrinkage" as used herein refers to a reduction in at least one dimension in terms of a length measurement following contact with an aqueous solution and drying, as compared to the measurement prior to aqueous solution contact.

The term "needle structured clay" as used herein refers to a clay having individual particles with needle shaped morphology, meaning long and narrow.

The term "plate structured clay" as used herein refers to a clay having individual particles with a plate-shape, meaning essentially flat and thin, but not necessarily round.

The term "slurry' as used herein refers to a suspension of solids in a liquid.

The term "substantially dispersed clay" as used herein refers to a form of a clay where a substantial portion of the particles of the clay exist as individual particles as opposed to being in clumps of particles. In the dispersed form, individual particles may touch each other such as crossing over each other or having a portion of their length touching, but they are still visible as individual particles. Preferably greater than about 50% of particles by mass of the clay exist as individual particles as opposed to being in clumps in a substantially dispersed clay.

The term "room temperature" as used herein refers to a temperature of about 20° C.-25° C.

"Structure", as used herein with regard to structures fabricated from the present continuous chitosan film, includes single layers or multiple layers of the continuous chitosan films.

Continuous chitosan films with reduced shrinkage that are described herein and are made by methods described herein may be used in structures to provide protection against hazardous chemical and biological agents, while allowing permeation to water vapor. When the structure is fabricated into apparel that is worn, the apparel is both protective and comfortable to wear. Reduced shrinkage of the present chitosan films provides improved integrity of the films following repeated exposure to aqueous environmental conditions, including washing.

Continuous Chitosan Film

Chitosan is the commonly used name for poly-[1-4]-β-D-glucosamine. It is commercially available and is chemically derived from chitin, which is a poly-[1-4]-β-N-acetyl-D-glucosamine that, in turn, is derived from the cell walls of fungi, the shells of insects and, especially, crustaceans. In the preparation of chitosan from chitin, acetyl groups are removed ("deacetylation"), and, in the chitosan used in the processes and articles disclosed herein, the degree of deacetylation is at least about 60%, and is preferably at least about 85%. As the degree of deacetylation increases, it becomes easier to dissolve chitosan in acidic medium.

Suitable chitosan-based moieties include chitosan, chitosan salts, and chitosan derivatives. Representative examples of chitosan derivatives suitable for use in the processes and articles disclosed herein include N- and O-carboxyalkyl chitosan. The number average molecular weight ($M_n$) in aqueous solution of the chitosan used herein is at least about 10,000.

A chitosan film may be cast from solution. If it is desired to cast a chitosan film from an aqueous solution, the chitosan is first solubilized, since chitosan is not soluble in water. Preferably, solubility is obtained by adding the chitosan to a dilute solution of a water-soluble acid. This allows the chitosan to react with the acid to form a water-soluble salt, herein referred to as a "chitosan salt" or "chitosan as the (acid anion) thereof", for example "chitosan as the acetate thereof" if acetic acid was used. Chitosan derivatives such as N- and O-carboxyalkyl chitosan that are water-soluble can be used directly in water without the addition of acid.

The acid used to solubilize the chitosan may be inorganic or organic. Examples of suitable inorganic acids include hydrochloric acid, sulfamic acid, warm to hot sulfuric acid, phosphoric acid and nitric acid. Suitable organic acids include water-soluble mono-, di- and polycarboxylic acids such as, for example, formic acid, acetic acid, pimellic acid, adipic acid, o-phthalic acid, levulinic acid, glyoxylic acid and halogenated organic acids. Other suitable acids are disclosed in U.S. Pat. No. 2,040,880. Mixtures of acids may also be used. Volatile acids, that is, those with a boiling point less than about 200° C., are preferred.

The amount of acid used to solubilize the chitosan can be chosen to control the viscosity. If too little acid is added, the resulting solution may be too viscous to cast a thin film and/or to be filtered. The desired amount of acid used will also depend on the desired chitosan concentration in the final solution, and on the molecular weight and degree of deacetylation of the starting chitosan, since those properties determine the molar concentration of amino groups ($-NH_2$) available to react with the acid. Typically the weight ratio of chitosan to acid is from about 2.68:1 to 1:1.

The appropriate concentration of chitosan in the solution will vary depending on how the solution is to be applied, and also on the molecular weight of the chitosan, as a lower concentration may be desired for a relatively high molecular weight chitosan. Different application methods may work better with solutions of different viscosities, but typically, the solution will contain from about 0.1 to about 15 wt % chitosan, based on the total combined weight of the solution and the chitosan.

The chitosan solution from which the film is prepared may include a release aid to aid in removal of the chitosan film from a substrate on which it is cast. The release aid is typically polar enough to be easily dispersed in aqueous solution and preferably does not alter physical properties of the chitosan film. The release aid may be a surfactant. In some embodiments, the release aid is the quaternary ammonium salt tricaprylylmethylammonium chloride; trioctylmethylammonium chloride (CAS#63393-96-4), which may be purchased as Aliquat® 336 from Aldrich Chemical Company (Milwaukee, Wis.).

The chitosan solution from which the film is prepared may include organic polymers, including natural polymers such as starch or cellulose, and synthetic polymers such as polyurethanes, polyamides, and polyesters. Such polymers may be soluble or insoluble in the chitosan solution. For example, a polyamide may be dissolved in a solution of chitosan and formic acid, while a polyurethane suspension in water would remain a suspension when added to a chitosan/acetic acid solution.

The chitosan solution from which the film is prepared is mixed with a needle structured clay, the plate structured clay sodium montmorillonite, or a mixture thereof, to form a mixture that is a slurry. In addition the chitosan solution or the chitosan and clay mixture may include inorganic fillers, including glass spheres, glass bubbles, additional clays (e.g., laponite, bentonite, illite, chlorite, and kaolinite) and the like. Small amounts of such fillers, preferably less than 10 wt %, can be used, for example, to increase thermal stability, modulus, and barrier properties of the chitosan film where this is desirable. Plate-structured fillers that may be added in chitosan films include, for example, mica, talc and vermiculite.

The chitosan solution from which the film is prepared may include additives such as flame retardants, plasticizers, stabilizers, tougheners, to enhance various properties of the chitosan film such as strength, flexibility, fire resistance and dimensional stability. For example, flexibility of the film when wet can be enhanced by addition of ketoacids such as glyoxylic acid and levulinic acid, which react with chitosan to form N-(carboxymethylidene) chitosans. N-(carboxymethylidene) chitosans can be insolubilized by heat-treating and are physically flexible in the presence of moisture. In other examples, film insolubility can be obtained by adding sugars such as glucose and fructose to the chitosan solution. Additives to a chitosan solution may be soluble in the solution, or they may be present as dispersed insoluble material. Adding sugars and di- or multi-functional acids can reduce the thermal requirements for rendering the chitosan insoluble. With these additives, annealing temperatures of about 100° C.-120° C. for about 1 to 10 minutes cause insolubility. The additives are present at less than 49% by weight, based on the weight of chitosan plus additives.

It has been found in connection with the processes disclosed herein that including in a chitosan film a needle structured clay or the plate structured clay sodium montmorillonite in a dispersed form provides a chitosan film that has reduced shrinkage as compared to the chitosan film lacking the clays. Needle structured clays that may be used include sepiolite, attapulgite, and halloysite. A preferred needle structured clay is sepiolite. Sepiolite is available commercially.

Figure 1B:
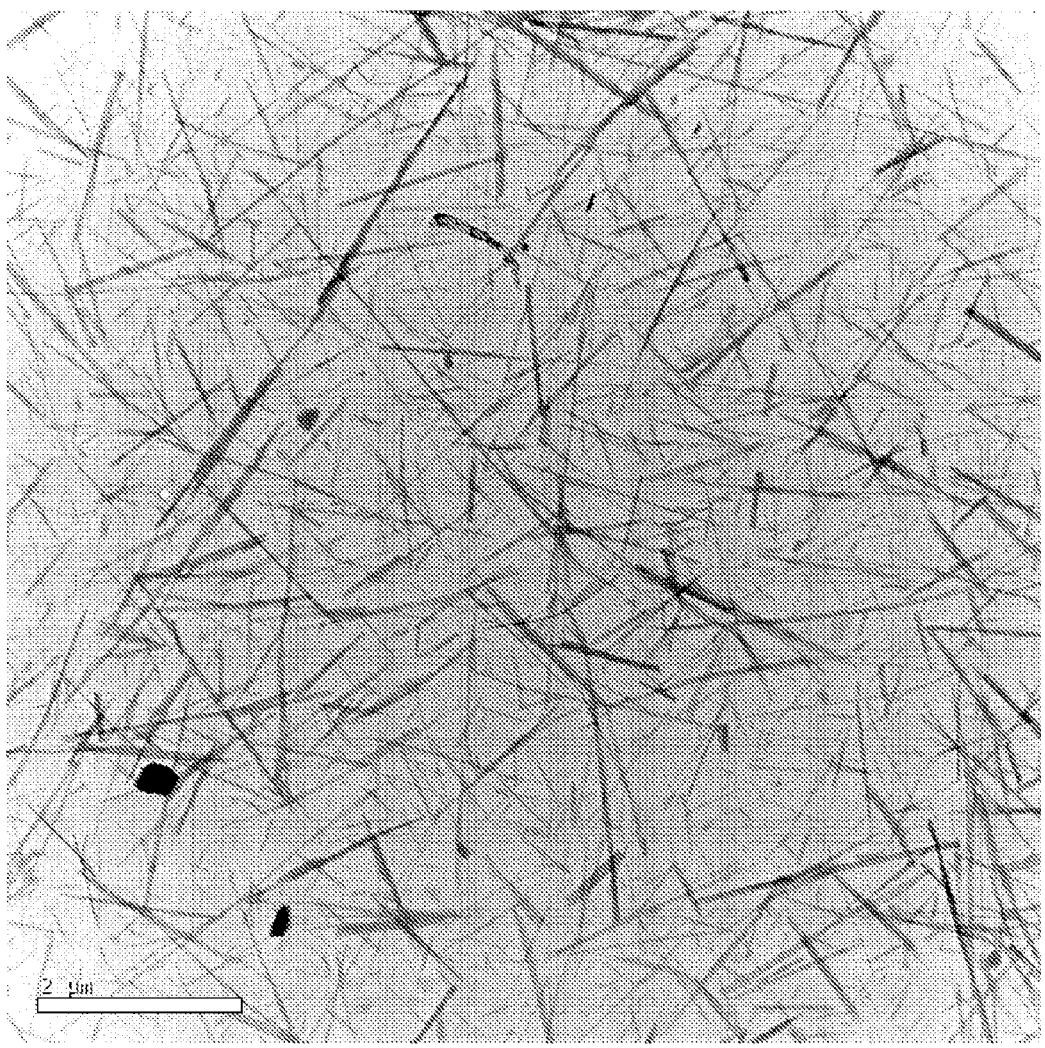

The needle structured clay or the sodium montmorillonite is in dispersed form for use in preparing the chitosan film. The dispersed form is a form in which at least a portion of the individual particles of the clay are separated from each other as opposed to being in clumps. Greater than about 50% of the mass of the clay exists as individual particles as opposed to being in clumps. A higher percentage, such as about 60%, 70%, 80%, 90%, or higher of particles may exist as individual particles. In some embodiments 90% or more, even up to 99% or 100%, of the mass of clay can exist as individual particles. Assessment of the dispersed form of the clay may be made by visual inspection of an electron micrograph taken of a clay slurry. For example, FIG. 1 shows an electron micrograph of sepiolite in as-received form in (A) where the sepiolite is not dispersed, and following purification in (B), where the sepiolite is dispersed. In the dispersed form, individual particles are visible (FIG. 1(B)). Individual particles may touch each other such as crossing over each other or having a portion of their length touching as seen in FIG. 1(B), however they are still visible as individual particles.

Any method of creating a clay dispersion may be used to render the needle structured clay or the sodium montmorillonite in substantially dispersed form. Methods are well known by one skilled in the art, such as by passing through a micro-fluidizer, by circulating through a high shear mixer, by mixing with a high-shear mixer, and by sonication. Dispersion of the clay results in a slurry comprising substantially dispersed clay.

The clay may be dispersed during a purification process used prior to mixing with a chitosan solution. The purification process may include steps such as addition of a dispersant, passing through a micro-fluidizer or using another dispersion method as described above, precipitation, and centrifugation to both remove at least some impurities and produce a dispersed clay. Alternatively, the undispersed clay may be added to a chitosan solution and the combined chitosan and clay mixture processed for dispersion. Typically when using undispersed clay, the chitosan and clay mixture is subjected to high-shear mixing. A dispersant may be added to the clay to aid in the dispersion. Dispersants that may be used include tetrasodium pyrophosphate decahydrate (TSPP) and tetrapotassium pyrophosphate (TKPP). Particularly useful is TSPP.

The dispersed clay is included in a mixture with chitosan that is used to prepare a film. The chitosan and clay mixture is typically a slurry. The amount of clay in the mixture with chitosan is an amount that results in the concentration of the clay in the prepared chitosan film of between about 0.5% and about 10% by weight based on the total weight of the film. The amount of clay in the prepared chitosan film may be about 0.5%, 1%, 2%, 3%, 4%, 5%, 6%, 7%, 8%, 9%, or 10% by weight. When a needle structured clay is included in the chitosan film in an amount that is about 1% or less, the clay is purified prior to making the chitosan and clay mixture used to prepare the film. Purified clay may be prepared using a purification process as described above. The amount of chitosan in the chitosan and clay mixture used to prepare a film is such that in the prepared chitosan film, chitosan is at least about 51% by weight.

A chitosan film may be prepared by casting a mixture of chitosan and substantially dispersed clay directly onto a substrate that will be incorporated along with the film into a structure such as a laminate. Alternatively, the mixture of chitosan and substantially dispersed clay may be cast onto a work device such as a smooth surface, such as glass or a polymer film (for example, polyester film). If the film is cast onto a work device, the film is then dried, detached and then incorporated into a structure such as a laminate in a separate step.

The mixture of chitosan and substantially dispersed clay may be applied to a substrate by any of a variety of methods known in the art. For a small scale process, such as a laboratory test sample, the mixture is typically applied using a doctor knife. Methods available to coat surfaces which are planar and have irregular surfaces include without limitation spray coating, dip coating, and spin coating. In a commercial process, the solution could be applied to, e.g., traveling web using methods that include without limitation reverse roll, wire-wound or Mayer rod, direct and offset gravure, slot die, blade, hot melt, curtain, knife over roll, extrusion, air knife, spray, rotary screen, multilayer slide, coextrusion, meniscus, comma and microgravure coating. These and other suitable methods are described by Cohen and Gutoff in "Coating Processes" in the *Kirk-Othmer Encyclopedia of Chemical Technology* [John Wiley & Sons, 5th edition (2004), Volume 7, Pages 1-35]. The method chosen will depend on several factors, such as the rheology of the mixture to be applied, the desired wet film thickness, the speed of a substrate that is traveling, and the required coating accuracy as a percent of total thickness.

The applied mixture is then dried by any suitable method known in the art such as exposure to a hot air oven, air impingement drying, or radiative (e.g. infrared or microwave) drying (See, generally, Cohen and Gutoff, op. cit.). The result of the drying at this stage is a continuous film. If the chitosan is dissolved in an aqueous solution of a volatile acid, that is, an acid whose boiling point is less than about 200° C., exposure to ambient air may be sufficient for drying, and drying will remove acid as well as water. Some typical methods for drying include maintaining at room temperature for about 18 hours, and passing through a 3-zone oven with equal zones at 70° C., 70° C. and 130° C. for about 1.5 minutes in each zone. Passing through a 3-zone oven with equal zones at 70° C., 100° C. and 160° C. for about 1.5 minutes in each zone will also dry and anneal the film.

If a film at this stage is water-soluble, it can be made water-insoluble by heating; by reacting it with a crosslinking reagent; by treatment with a strong base; or by a combination of two or more of these methods. For example, a film cast from a formic acid solution can be made water-insoluble by heat treatment after the film has been formed and dried, for example, by heating at between about 100° C. and about 260° C. for about 0.1 to about 60 minutes, or more preferably between about 100° C. and 180° C. for about 1 to 10 minutes. The drying time and temperature are inversely correlated with shorter times used for higher temperatures Heat treatment plus the use of a crosslinking agent may also be used to render the chitosan film insoluble.

The film can also be made insoluble by adding a crosslinking agent to the mixture before a film is cast therefrom. A crosslinking agent is a reactive additive that creates bonds, i.e. crosslinks, between polymer chains. Examples of crosslinking agents for chitosan include glutaraldehyde and di-, and tri-carboxylic acids including succinic, malic, tartaric, and citric acids. Crosslinking agents may also be applied to the film after it is dried.

The film can also be made water-insoluble by contacting the film with a base and then washing, which converts the film from the chitosan salt form to free chitosan. If the film to be treated with base is attached to a substrate, the composition and concentration of the base will be influenced by the nature of the substrate (e.g., its reactivity toward base) and processing conditions (e.g., temperature and contact time, continuous versus batch process). Typically, the base is a 1% to 10% by weight aqueous solution of sodium hydroxide, and typical contact times are 30 seconds to 3 hours at ambient temperature. Heat treatment plus contact with base may also be used to render the film insoluble.

The present chitosan films desirably have reduced shrinkage as compared to a chitosan film not containing the substantially dispersed clay. Shrinkage in the present chitosan films containing dispersed clay is preferably less than about 8% of the original length of the chitosan film. After drying and removing a chitosan film from the substrate on which it was cast, its shrinkage may be assessed by measuring a dimension, such as length, before and after wetting then drying the film. Heating a thin film cast from an acetic acid aqueous solution for a few minutes at about 130° C., or greater than about 1 minute at about 160° C. will make it sufficiently insoluble that the wet film can be handled for shrinkage measurement. Shrinkage may be less than about 8%, 7%, 6%, 5%, 4%, or 3%. Following drying as described above, the present films may be heated at a temperature between about 140° C. and about 160° C. The films are typically heated at a temperature of about 160° C. Cast films may be placed directly in a 160° C. oven where they will first undergo drying at temperatures lower than 160° C. while water evaporates, then heat to 160° C. Heating the film at a temperature of about 160° C. before wetting and then drying for measuring shrinkage can provide greater reduction in shrinkage as compared to the same chitosan film that is not heated at 160° C. Heating may be for about 0.5, 1, 2, 3, 4, 5 or more minutes up to about 10 minutes. In addition, aging the film at room temperature for 24 hours or more before wetting and then drying for measuring shrinkage can provide greater reduction in shrinkage than without aging. Aging may be for about 24 or 48 hours, or up to about 5 days, or more.

Curling of a chitosan film is also reduced when present in a laminate by inclusion of a needle structured clay, sodium montmorillonite, or a combination of these clays, which are substantially dispersed. As shown in Examples 17 and 18, as compared to Comparative Example 4, a laminate comprising the present film has much reduced curling after wetting and drying.

Substrate Materials

The present chitosan films containing the clay are cast onto a substrate ("work surface"), which may itself be a continuous sheet or film. A suitable substrate will have at least one surface that is smooth, i.e., essentially without protrusions above the plane of the substrate that are higher than the desired thickness of the coating of chitosan that will be transformed into the film. Thus, a smoother substrate surface is required when the desired thickness of the coating of chitosan is 25 microns than when it is 100 microns. A typical work surface is a PET sheet. This substrate with a cast chitosan film thereon may be referred to as a PET backing.

The chitosan film may be removed from the substrate for fabrication into a structure, or it may be incorporated along with the substrate into a structure. The chitosan film may be coated with an additional layer or layers while on the work surface, or after removing it from the work surface.

If the chitosan film is to remain on the substrate, the substrate provides permeability to water vapor that is adequate for the particular end use. For example, a garment may require higher water vapor permeability than a tent or tarpaulin.

A suitable substrate may be, for example, a film, a sheet whose permeability to water vapor under use conditions is adequate for the particular end use, a microporous membrane (i.e., one in which the typical pore size is about 0.1 to 10 micrometers in diameter), or an article prepared from any of the foregoing. It is preferred that the substrate surface that will be in contact with the chitosan film be both smooth and nonporous. Suitable substrate materials include polar polymer films, including elastomers, glassy polymers, and semi-crystalline materials. A polar polymer has both dispersion and dipole-dipole forces, while a non-polar polymer has only dispersive attractive forces. Polar polymers generally contain a substantial fraction of oxygen and nitrogen containing groups, while non polar polymers contain a substantial fraction of hydrocarbon or fluorocarbon with minimal oxygen and nitrogen containing groups.

Examples of suitable substrate materials include Nafion® perfluorosulfonic acid tetrafluoroethylene copolymer (available from E. I. du Pont de Nemours and Company, Wilmington, Del., USA), polyurethanes (e.g., polyurethane films available from Omniflex Co., Greenfield, Mass., USA), polyether block polyamide copolymers (e.g., Pebax® polyether block amides available from Arkema, Paris, France), polyether block polyester copolymers, sulfonated styrene-polyolefin di- and tri-block copolymers, and polyvinyl alcohol homopolymers and copolymers.

Structures

The present chitosan films can be incorporated into structures. In one embodiment the structures provide protection against exposure to a chemical or biological agent that is harmful to human health. The structures can be used in articles and items of apparel that protect against exposure to a chemical or biological agent that is harmful to human health. In addition, it is desired that the structures maintain sufficient water vapor permeability to maintain personal comfort when the laminate is used to fabricate an item of apparel.

In one embodiment the structure comprises a laminate including the present chitosan film. Specific embodiments include finished articles, including articles of apparel, fabricated from the present continuous chitosan film or a selectively permeable laminate containing the present continuous chitosan film. The protective laminates described herein comprise a continuous chitosan film and at least one layer of fabric. As appropriate, additional layers (for example, a second fabric layer or a microporous membrane) can be used in a laminate with the objective of (a) creating a composite structure that protects the chitosan film from an environment that may degrade its performance, and/or (b) creating a laminate, and potentially thus a composite structure thereof, that has features in addition to those offered only by the chitosan film and the at least one fabric layer, and/or (c) improving the performance of the final structure.

Figure 2:
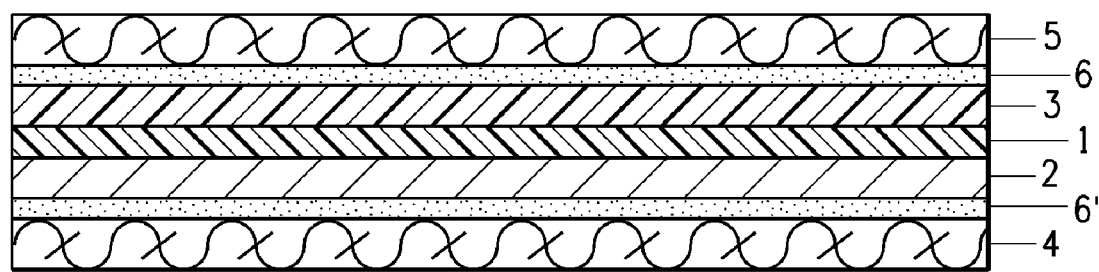
FIG. 2 is a schematic diagram showing the structure of one type of laminate according to an embodiment of the present invention.

FIG. 2 illustrates one embodiment of a laminate that could be used in, for example, an article of apparel. In the embodiment shown, the laminate contains the following elements: a continuous chitosan film comprising a substantially dispersed clay that is a needle structured clay, sodium montmorillonite, or a combination of these clays (1); an additional layer on one side of the chitosan film (2); an additional layer on the other side of the chitosan film (3); an inner liner (4); an outer shell (5) and adhesive (6, 6"). However, not all embodiments of the selectively permeable laminates contain all of the elements shown in FIG. 2.

An additional layer may be, for example, additional films or microporous membranes that are applied to one of both outer surfaces of the chitosan film by coating, thermal lamination, or other means known in the art, to protect the chitosan and substrate films from dust and liquids or physical damage. One or more layers of ballistic fabrics can be used to absorb the impact of a projectile and protect the wearer from harm.

In many end uses, particularly apparel, the continuous chitosan film (and its associated substrate, where present) is incorporated into a structure that includes an outer layer of material (an "outer shell," 5 in FIG. 2) which is exposed to the environment and/or an inner liner 4.

The outer and inner materials may each be chosen for functional reasons such as ruggedness, ballistic resistance, and resistance to abrasion or tearing, as well as to impart a comfortable feel and a fashionable appearance to apparel. Colored and patterned materials may also be used as outer layers to introduce camouflage features in military applications. The outer shell and inner liner materials are typically fabric or microporous membranes.

Fabrics may be wovens or nonwovens (e.g., nonwoven sheet structures created by spun bonded/melt blown processes or by electrospinning as described in, e.g., Z.-M. Huang et al., Composites Science and Technology (2003), 63, 2223-2253). Fabrics may be prepared from any synthetic or natural fiber appropriate for the specific end use in mind. Preferred fabrics may be prepared from aramids, nylons, polyesters, cotton, and blends comprising any of these, such as, but not limited to blends of nylon and cotton fibers ("NYCO"). The term "nylon" as used herein refers to polyamides other than aramids. An aramid is an aromatic polyamide, wherein at least 85% of the amide (—CONH—) linkages are attached directly to two aromatic rings. Flame retardant fibers, including aramids (preferably up to 40%) may be blended with an aramid to impact fabric thermal performance and comfort. A suitable aramid may be in the form of a copolymer that may have as much as 10 percent of other diamine(s) substituted for the diamine of the aramid or as much as 10 percent of other diacid chloride(s) substituted for the diacid chloride of the aramid. A p-aramid would be preferred in a fabric as used in this invention, and poly(p-phenylene terephthalamide) (PPD-T) is the preferred p-aramid. M-aramids may also find use in the present invention, and poly (m-phenylene isophthalamide) (MPD-I) is the preferred m-aramid. P-aramid and m-aramid fibers and yarns particularly suitable for use in the present invention are those sold respectively under the trademarks Kevlar® and Nomex® (E. I. du Pont de Nemours and Company, Wilmington Del., USA), and Teijinconex®, Twaron® and Technora® (Teijin Ltd., Osaka, Japan), and equivalent products offered by others. Typically, the aramid fabric would be used in the outer shell, and the inner liner would more likely contain fabric such as polyester, nylon, cotton, or blends thereof, though m-aramids may be utilized as part of the inner liner as well to improve fire resistance Films and microporous membranes may be prepared from any synthetic or natural material appropriate for the specific end use in mind. Examples of films and microporous membranes that can be used as a component of inner liners or outer shells include without limitation expanded poly(tetrafluoroethylene) membranes such as those sold under the trademark GORE-TEX® (W. L. Gore & Associates, Inc., Newark, Del., USA); hydrophobic polyurethane microporous membranes (see, e.g., S. Brzeziński et al., Fibres & Textiles in Eastern Europe, January/December 2005, 13(6), 53-58); microporous (poly)propylene available from, e.g., 3M (St. Paul, Minn., USA); thin films of thermoplastic polyurethane such as those sold under the trademark Transport® Brand Film by Omniflex (Greenfield, Mass., USA); Pebax® polyether block amide by Arkema (Paris, France); and DuPont™ Active Layer, a polyester film available from E. I. du Pont de Nemours and Company (Wilmington, Del., USA).

Fabrication

The selectively permeable laminates described herein can be assembled using any of the any of the sewing, stitching, stapling or adhering operations, such as thermally pressing, known in the art.

Referring to FIG. 2, the layers to be assembled include the chitosan film 1 and at least one other layer. For example, if the chitosan film is cast on a work device, the film is then dried and detached as a free-standing film. Other layers could be added either before or after detachment from the work device. It may then be attached to another layer (for example, substrate, outer shell, inner liner) using an adhesive such as a polyurethane-based adhesive. The adhesive may be present as an array of adhesive dots, or in a number of alternative patterns such as lines or curves. The adhesive may be applied in a variety of ways including spraying or gravure roll.

To fabricate a structure or other article from a laminate disclosed herein, such as an item of apparel, the laminate may be sandwiched between (additional) woven fabrics. Bonding between the film structure and the fabrics may be continuous or semicontinuous, for example, with adhesive dots or films. Alternatively, the bonding may be discontinuous, for example by sewing the edges together, an arrangement often referred to as a "hung liner". Other means of discontinuous bonding may include the use of Velcro® strips or zippers.

Uses

The laminate, as well as the continuous chitosan film, is selectively permeable, having a Moisture Vapor Transport Rate ("MVTR") of at least 2 kg/m$^2$/24 h, while the transport rate of materials harmful to human health is low enough to prevent the occurrence of injury, illness or death. The specific transport rate needed will depend on the harmful material; for example, NFPA 1994, 2006 Revision requires <4.0 µg/cm$^2$ one hour cumulative permeation for mustard and <1.25 µg/cm$^2$ for Soman, both of which requirements are met by the laminates and the continuous chitosan film. Consequently, the laminates, as well as the continuous chitosan film, can be used for the fabrication of, or as a component in, a variety of articles of manufacture, including articles of protective apparel, especially for clothing, garments or other items intended to protect the wearer or user against harm or injury as caused by exposure to toxic chemical and/or biological agents, including those agents potentially used in a warfighter environment and materials identified as "Toxic Industrial Chemicals" (TICs) or "Toxic Industrial Materials" (TIMs); see, for example, *Guide for the Selection of Chemical and Biological Decontamination Equipment for Emergency First Responders, NIJ Guide* 103-00, Volume I, published by the National Institute of Justice, U.S. Department of Justice (October 2001), herein incorporated by reference. A few examples of TICs are phosgene, chlorine, parathion, and acrylonitrile. Permeability of the laminate or a layer in the laminate to specific substances may be determined by various methods such as those described in ASTM F739-91, "Standard Test Method for Resistance of Protective Clothing Materials to Permeation by Liquids or Gases Under Conditions of Continuous Contact."

In one embodiment, the item of apparel is useful to protect military personnel against dermal exposure to chemical and biological agents potentially encountered in a warfighter environment. Examples of such agents include without limitation nerve agents such as Sarin ("GB," O-isopropyl methylphosphonofluoridate), Soman ("GD," O-Pinacolyl methylphosphonofluoridate), Tabun ("GA," O-Ethyl N,N-dimethylphosphoramidocyanidate), and VX (O-Ethyl S-2-diisopropylaminoethyl methylphosphonothiolate); vesicant agents such as sulfur mustards (e.g., Bis(2-chloroethyl)sulfide and Bis(2-chloroethylthio)methane); Lewisites such as 2-chlorovinyldichloroarsine; nitrogen mustards such as Bis-(2-chloroethyl)ethylamine ("HN1"); tear gases and riot control agents such as Bromobenzyl cyanide ("CA") and Phenylacyl chloride ("CN"); human pathogens such as viruses (e.g., encephalitis viruses, Ebola virus), bacteria (e.g., *Rickettsia rickettsii, Bacillus anthracis, Clostridium botulinum*), and toxins (e.g., Ricin, Cholera toxins). A human pathogen is a microorganism that causes disease in humans.

In a further embodiment, the item of apparel is useful to protect first responder personnel from known or unknown chemical or biological agents potentially encountered in an emergency response situation. In yet another embodiment, the item is intended to protect cleanup personnel from chemical or biological agents during a hazmat response situation.

Examples of hazardous material in addition to those listed above include certain pesticides, particularly organophosphate pesticides.

Such clothing, garments or other items include without limitation coveralls, protective suits, coats, jackets, limited-use protective garments, raingear, ski pants, gloves, socks, boots, shoe and boot covers, trousers, hoods, hats, masks and shirts.

In another embodiment, the laminates can be used to create a protective cover, such as a tarpaulin, or a collective shelter, such as a tent, to protect against chemical and/or biological warfare agents.

Furthermore, the laminates can be used in various medical applications as protection against toxic chemical and/or biological agents. In one embodiment, the laminates could be used to construct items of apparel for health care workers, such as medical or surgical gowns, gloves, slippers, shoe or boot covers, and head coverings.

EXAMPLES

Specific embodiments of the present invention are illustrated in the following examples. The embodiments of the invention on which these examples are based are illustrative only, and do not limit the scope of the appended claims.

The meaning of the abbreviations used in the examples is as follows: "s" means second(s), "min" means minute(s), "h" means hour(s), "kg" means kilogram(s), "g" means gram(s), "mg" means milligram(s), "µg" means microgram(s), "oz" means ounce(s), "yd" means yard(s), "mmol" means millimole(s), "m" means meter(s), "cm" means centimeter(s), "mm" means millimeter(s), "µm" means micrometer(s), "mL" means milliliter(s), "µL" means microliter(s), "M" means molar, "N" means normal, "wt %" means weight percent, "ppm" means parts per million, "MW" means molecular weight, "$M_n$" means number average molecular weight, "$M_w$" means weight average molecular weight, "Pa" means Pascal, "kPa" means kilopascal, "psig" means pounds per square inch gage, "PU" means polyurethane, and "SEC" means size exclusion chromatography. Unless otherwise specified, the water used is distilled or deionized water. "PET" means polyethylene terephthalate.

The chitosan materials used in the following Examples were obtained from Marinard Biotech, Quebec, Canada or Primex Ingredients ASA, Norway under the trademark ChitoClear® chitosan, as noted. According to the manufacturer, Primex ChitoClear® TM-656 has a Brookfield viscosity of 26 cP (0.026 Pa·s, 1% chitosan in a 1% aqueous acetic acid solution). The Mn and Mw were determined by SEC to be 33,000 and 78,000, respectively. Sepiolite is available, for example, as Pangel® S9 from Grupo Tolsa SA (Madrid, Spain) or sepiolite from IMA-Europe (Brussels, Belgium). Sodium montmorillonite is commercially available, such as Cloisite® Na+ from Southern Clay Products, Inc, (Gonzales, Tex.) or montmorillonite from Nanocor (Arlington Heights, Ill.).

Methods

Sepiolite Purification Procedure:

The as-received sepiolite Pangel® S9 (Grupo Tolsa SA Madrid, Spain) was purified by the following procedure: 33.0 g tetrasodium pyrophosphate decahydrate (TSPP, Aldrich 221368) was dissolved in 3.3 L water in a 1-gallon jug while stirring with an overhead stirrer for 5 minutes. 100 g of sepiolite Pangel® S9 (Tolsa SA) was slowly added while mixing vigorously for 15 min. The slurry was further dispersed by passing it through a Microfluidics Corp. Microfluidizer Model 110Y four times. Material was allowed to precipitate for at least 6 days. The precipitate was separated from the supernatant by decantation. The sepiolite was separated in a tube centrifuge driven by compressed air (40 psi) with a flow rate of about 250 ml/min. The solid content in the wet-cake, which was typically about 55%, was the purified sepiolite.

The purified sepiolite was re-dispersed by adding 1757 g water in a 1-gallon plastic jug and mixing it for 15 minutes at 8000 RPM with a Silverson Rotor-stator model L4RT-A, and then further sonifying it by using a sonication tip to produce a purified sepiolite slurry.

Shrinkage Measurement Procedure:

In most cases, the films were kept on their PET backing and prepared for measurement by heating them (~130° C.-160° C., for a few minutes, as indicated in the examples). This heating of films gave them more robust strength so they could be handled during the delicate shrinkage measurement, especially while removing them after the moisture saturation step without imparting damage into the films. Room temperature aging on the PET substrate for about 5 days was also found to lead to robust strength of wet films, and gave the same values of shrinkage unless the film detached from the PET substrate. Typically, rectangular strips were cut from the 130° C.-160° C. pre-heated films, about 20 mm long by 4 mm wide. The films were removed from the backing and wetted by contact with either liquid water or a water-soaked paper towel. The films were then dried for 10 minutes at 50° C. The linear shrinkage was measured relative to the initial film dimension: % shrinkage=100×(initial length−final length)/(initial length). The shrinkage was typically measured by stretching out the somewhat-wrinkled film along the long direction of the film strip. The linear shrinkage was independent of whether the film was wet by liquid water or a water-soaked paper towel.

In some cases, after the heating step described above, the film was removed from the PET backing and allowed to age at room temperature for about 48 hrs before the strip was cut and its dimensions measured. The strip was then exposed to water, dried, and remeasured as described above.

Moisture Vapor Transmission Rate (MVTR)

This is measured by a method derived from the Inverted Cup method of MVTR measurement [ASTM E 96 Procedure BW, Standard Test Methods for Water Vapor Transmission of Fabrics (ASTM 1999)]. A vessel with an opening on top is charged with water and then the opening is covered first with a moisture vapor permeable (liquid impermeable) layer of expanded-PTFE film ("ePTFE"), and then with the sample for which the MVTR is to be measured, and finally by woven fabric overlayer [NYCO 50:50 nylon/cotton blend, 6.7 oz/yd$^2$ (0.23 kg/m$^2$) or Nomex® fabric, 5.6 oz/yd$^2$ (0.19 kg/m$^2$), both treated with durable water repellant finish]. The three layers are sealed in place, inverted for 30 minutes to condition the layers, weighed to the nearest 0.001 g, and then contacted with a dry stream of nitrogen while inverted. After the specified time, the sample is re-weighed and the MVTR calculated (kg/m$^2$/24 h) by means of the following equation:

$$MVTR=1/[(1/MVTR_{obs.})-(1/MVTR_{mb})]$$

where $MVTR_{obs}$ is observed MVTR of the experiment and $MVTR_{mb}$ is the MVTR of the ePTFE moisture barrier (measured separately). The reported values are the average of results from four replicate samples.

Dimethylmethylphosphonate ("DMMP") Permeation

DMMP is used as a relatively non-toxic simulant for chemical warfare G-class nerve agents. The DMMP permeation measurement for the examples described below was carried out as follows: a vessel with an opening on top was charged with a measured amount of water containing 0.100% propylene glycol as an internal GC standard. If the sample was a film, the opening was covered with the sample film and a woven fabric overlayer [NYCO 50:50 nylon/cotton blend, 6.7 oz/yd$^2$ (0.23 kg/m$^2$) or Nomex®, 5.6 oz/yd$^2$ (0.19 kg/m$^2$), both treated with durable water repellant finish] was placed on top of the film, and the layers were sealed in place. If the sample was a laminate that already had a fabric surface, no additional fabric overlayer was used. In both types of samples, the fabric surface was treated with one 2 µL drop of DMMP (2.3 mg). The vessel was placed in a nitrogen-purged box for 17 h and then the DMMP concentration in the water was measured by GC analysis. Results are reported in µg of DMMP measured in the water after 17 h and are the average of five replicate samples. The DMMP was obtained from Aldrich Chemical Company (Milwaukee, Wis.) and was used as received.

Comparative Example 1

Neat Chitosan Acetate

A 6% chitosan solution was made by adding 48 g of ChitoClear® TM-656 (Primex Inc.) to a solution of 24 g acetic acid and 728 g of water. The solution was mixed with an overhead agitator with a paddle blade and heated to 67° C. and mixed for 2 hours at this temperature. Upon cooling, a film was cast onto a PET sheet (7 mils; 178 micron) by using a doctor's blade with an opening of 500 microns. The resulting film was dried by placing in a 160° C. oven with a small nitrogen purge and held for 1 minute after a thermocouple placed on the initially wet film read about 158° C. Shrinkage was tested as described in General methods after peeling the chitosan film from the PET substrate and aging at room temperature for 48 hrs. The shrinkages for two strips of this 12 micron-thick chitosan film were determined to be 11.1% and 12%.

Comparative Example 2

Neat Chitosan Acetate (with Aliquat® 336) Over-Coated with Estane® Polyurethane

Seventy-six liters of a 5.5% ChitoClear® TM-656 (Primex Inc) chitosan solution with 2.75% glacial acetic acid and 0.0127% Aliquat® 336 (Cognis Inc; added as a 4.1% masterbatch in water) was made with water in a 20 gallon stirred tank. The solution was heated at 50° C. for 2 hrs and then heated at 70° C. for 2 hrs. The solution was circulated through an IKA High Shear Mixer Model DR2000/10 at 2800 RPM during this time before being filtered through two 10 micron bag filters in parallel. The solution was then placed in another stirred tank and pumped by positive-displacement pump through a 20 micron depth filter and then a 66 cm wide slot die onto a moving 75 micron thick PET substrate. The opening of the slot die was adjusted to give a dried film thickness of 16 microns. The film was dried in a 3-zone oven at temperatures from 70° C. to 130° C., covered with a polyethylene sheet, and wound-up. The 3-zone oven was 45 feet long with a moving line at 10 feet/min for a total drying time of 4.5 min. Three equal length temperature zones (15 feet) were at 70° C., 70° C. and 130° C. In a second pass, after removing the cover sheet, an 11% solution of Estane® 58237 polyurethane (Lubrizol, Wickliffe, Ohio) in tetrahydrofuran was cast over the chitosan film and dried in a 3-zone oven at 50° C. to 130° C. as described above except with temperatures of 50° C., 90° C. and 130° C. The slot die opening was adjusted to give a dried film thickness of 8 microns. The film was covered by a 50 micron thick PET sheet and wound-up. After heating for 1 minute at 160° C. while on the PET substrate, the shrinkage of the chitosan film with Estane® over-coat was measured (using the procedure in General Methods) to be 12.3%. For identical pieces of chitosan film to which the Estane® coating had not been applied, the shrinkage measured 13% and 13.6%.

Comparative Example 3

Chitosan Acetate with TSPP

A pre-mixed solution of 2.2 grams of tetrasodium phosphate decahydrate (TSPP, Sigma Aldrich 221368) in 3.24 g water was added to fifty grams of the 6% chitosan solution of Comparative Example 1. This solution was mixed with an IKA Ultra-Turrax T-25 high-shear mixer at 13,500 RPM for 5 minutes with a "milkshake" style motion and then allowed to stand for 24 hours to degas the solution. The procedure of Comparative Example 1 was then followed to cast an 11 micron-thick film. The film shrinkage (measured using the procedure in General Methods) was measured as 12.1%.

Example 1

Chitosan Acetate with 5 wt % Purified Sepiolite
(Based on Total Solids in the Film)

A 6% chitosan acetate solution was made as described in Comparative Example 1. One hundred fifty grams of this solution was mixed with 16.33 grams of purified sepiolite slurry with a sepiolite concentration of 2.9% based on total solution weight with an IKA Ultra-Turrax T-25 high-shear mixer at 13,500 RPM with a "milkshake" style motion. The chitosan solution and sepiolite slurry were mixed for 5 minutes, stopped for 1 minute, then further mixed for 3 more minutes. It was then allowed to stand for 24 hours to degas.

The added purified sepiolite slurry had been made by adding 2.67 g of purified sepiolite into 80 g water in a 100 ml glass bottle. The purified sepiolite (prepared as in General Methods) had been dried and was added as a powder, rather than the wet cake as indicated in the sepiolite purification procedure above. The calculation therefore assumed that this powder picked up 10% water. After degassing, the sepolite slurry was sonified in a sonication bath for 15 minutes. The slurry was further sonified for 15 minutes using a sonication tip. The slurry was allowed to settle for 20 hours and the supernatant was decanted to leave behind any impurities.

A film was cast from the chitosan/sepiolite slurry onto a PET sheet (7 mils; 178 micron) by using a doctor's blade with an opening of 500 microns. The film was dried as in Comparative Example 1. The calculated sepiolite concentration of this dried 12 micron-thick film was 5%. The shrinkage of this film (measured using the procedure in General Methods) was 9.5%.

Example 2

Chitosan Acetate with 4.8 wt % Purified Sepiolite
(Based on Total Solids in the Film)

A 4.8% chitosan acetate solution was made by first mixing 390 g of water and 10 g acetic acid using an overhead agitator with a paddle blade. The mixture was heated to 75° C. while 20 g of ChitoClear® TM-656 (Primex Inc.) powder was added. Mixing continued for 3 hours. One hundred fifty grams of this chitosan acetate solution was mixed with 12.5 g of purified sepiolite slurry (prepared as described in Example 1) with a sepiolite concentration of 2.9% with an IKA Ultra-Turrax T-25 high-shear mixer at 10,000 RPM with a "milkshake" style motion. It was mixed for 5-10 minutes and then allowed to stand for 24 hours to degas.

A film was cast from the supernatant chitosan/sepiolite slurry onto a PET sheet (7 mils; 178 micron) by using a doctor's blade with an opening of 500 microns. The film was dried as in Comparative Example 1. The calculated sepiolite concentration of this dried 13 micron-thick film was 4.8%. The shrinkage of 2 samples of this film was measured at 5% and 6.6% using the procedure in General Methods.

Example 3

Chitosan Acetate with 2.3 wt % Purified Sepiolite
(Based on Total Solids in the Film)

A 6% chitosan acetate solution was made by adding 12 g of ChitoClear® TM-656 (Primex Inc.) powder to 163.8 g of water. The container was placed in a 50° C. water bath and mixed with an overhead agitator with paddle for 5 minutes. Next, an additional 18.2 g of water and 6 g of acetic acid were added and mixed for 10 minutes. Twenty grams of this solution was added to 24 g of the chitosan/purified sepiolite slurry made in Example 2 and mixed on a roller. A film was cast from the chitosan/sepiolite slurry onto a PET sheet (7 mils; 178 micron) by using a doctor's blade with an opening of 380 microns. The film was dried as in Comparative Example 1. The calculated sepiolite concentration of this dried 15 micron-thick film was 2.3%. The shrinkage of this film was measured at 6.3% using the procedure in General Methods.

Example 4

Chitosan Acetate with 0.90 wt % Purified Sepiolite
(Based on Total Solids in the Film)

Forty grams of the 6% chitosan acetate solution used in Example 3 were added to 12 grams of the of the chitosan/purified sepiolite slurry made in Example 2 and mixed on a roller. A film was cast from the chitosan/sepiolite slurry onto a PET sheet (7 mils; 178 micron) by using a doctor's blade with an opening of 380 microns. The film was dried as in Comparative Example 1. The calculated sepiolite concentration of this dried 13 micron-thick film was 0.9%. The shrinkage of this film was measured at 5.5% and 6.5% using the procedure in General Methods.

Example 5

Chitosan Acetate with 5.1 wt % as-Received
Sepiolite (Based on Total Solids in the Film)

A 6% chitosan acetate solution was made as described in Example 1. One hundred fifty grams of this solution was mixed with 0.53 g of as-received sepiolite (assumes 10% extra water weight in clay) and 15.8 g of water. The mixing was with an IKA Ultra-Turrax T-25 high-shear mixer at 13500 RPM with a "milkshake" style motion. The mixing continued for 5 minutes. It was then stopped for 1 minute then further mixed for 3 more minutes, before standing for 24 hours to degas. A film was cast from the chitosan/sepiolite slurry onto a PET sheet (7 mils; 178 micron) by using a doctor's blade with an opening of 500 microns. The film was dried as in Comparative Example 1. The calculated sepiolite concentration of this dried 12 micron-thick film was 5.1%. The shrinkage of this film was measured at 9.5%.

Example 6

Chitosan Acetate with 4.9 wt % as-Received Sepiolite (Based on Total Solids in the Film)

A 4.8% chitosan acetate solution was made by first mixing 390 g of water and 10 g acetic acid using an overhead agitator with a paddle blade. The mixture was heated to 75° C. while 20 g of ChitoClear® TM-656 (Primex Inc.) powder was added. Mixing continued for 3 hours. One hundred fifty grams of this chitosan acetate solution was mixed with 0.417 g (assumes 10% water) of as-received sepiolite. This slurry was mixed with IKA Ultra-Turrax T-25 high-shear mixer at 10,000 RPM with a "milkshake" style motion for 5 minutes. It was then allowed to stand for 24 hours to degas. A film was cast from this chitosan/sepiolite slurry onto a PET sheet (7 mils; 178 micron) by using a doctor's blade with an opening of 500 microns. The film was dried as in Comparative Example 1. The calculated sepiolite concentration of this dried 15 micron-thick film was 4.9%. The shrinkage of this film was measured at 6%.

Example 7

Chitosan Acetate with 2.5 wt % as-Received Sepiolite (Based on Total Solids in the Film)

Twenty four grams of the chitosan/as-received sepiolite slurry from Example 6 was mixed on a roller with 20 grams of the 6% chitosan acetate solution used in Example 3. A film was cast from this chitosan/sepiolite slurry onto a PET sheet (7 mils; 178 micron) by using a doctor's blade with an opening of 380 microns. The film was dried as in Comparative Example 1. The calculated sepiolite concentration of this dried 13 micron-thick film was 2.5%. The shrinkage of this film, measured after peeling the chitosan film from the PET substrate and aging at room temperature for 48 hrs, was 2.9%.

Example 8

Chitosan Acetate with 1 wt % as-Received Sepiolite (Based on Total Solids in the Film)

Twelve grams of the chitosan/as-received sepiolite slurry from Example 6 was mixed on a roller with 40 g of the 6% chitosan acetate solution used in Example 3. A film was cast from this chitosan/sepiolite slurry onto a PET sheet (7 mils; 178 micron) by using a doctor's blade with an opening of 380 microns. The film was dried as in Comparative Example 1. The calculated sepiolite concentration of this dried 11 micron-thick film was 1%. The shrinkage of 2 samples of this film was measured at 15.5% and 12.1%.

Example 9

Chitosan Acetate with 5 wt % as-Received Sepiolite (Based on Total Solids in the Film) with TSPP A 2.9% as-received sepiolite slurry was made by adding 2.67 g of as-received sepiolite (assuming 10% water in sepiolite) into 80 g water in a 100 ml glass bottle. The mixture was sonified in a sonication bath for 15 minutes. Then, 0.067 g of tetrasodium pyrophosphate decahydrate (TSPP) was added into the dispersion. The mixture was further sonified for 15 minutes using a sonication tip. This slurry was allowed to settle for 20 hours and the supernatant was decanted to leave behind any trace of impurities. 16.33 g of this as-received sepiolite slurry was then mixed with 150 g of the chitosan acetate solution of Example 5 using an IKA Ultra-Turrax T-25 high-shear mixer at 13,500 RPM with a "milkshake" style motion. The mixing continued for 5 minutes. It was then stopped for 1 minute then further mixed for 3 more minutes, before standing for 24 hours to degas. A film was cast from the chitosan/sepiolite slurry onto a PET sheet (7 mils; 178 micron) by using a doctor's blade with an opening of 500 microns. The film was dried as in Comparative Example 1. The calculated sepiolite concentration of this dried 11 micron-thick film was 5 wt % based on total solids. The shrinkage of 2 samples of this film was measured at 5.6% and 6.2%.

Example 10

Chitosan Acetate with 5 wt % Cloisite® Na+ (Based on Total Solids in the Film) with TSPP A 6% chitosan acetate solution was made as described in Example 1. One hundred fifty grams of this chitosan acetate solution was mixed with 16.4 grams of water and 9.44 g of a premixed 5% Cloisite® Na+ (Southern Clay Products, Inc, Gonzales, Tex.) slurry with 0.1% TSPP using an IKA Ultra-Turrax T-25 high-shear mixer at 13,500 RPM with a "milkshake" style motion. The mixing continued for 5 minutes. It was then stopped for 1 minute then further mixed for 3 more minutes, before standing for 24 hours to degas. A film was cast from the chitosan/Cloisite® Na+ slurry onto a PET sheet (7 mils; 178 micron) by using a doctor's blade with an opening of 500 microns. The film was dried as in Comparative Example 1. The calculated Cloisite Na+ concentration of this dried 12 micron-thick film was 5 wt % based on total solids. The shrinkage of this film was measured at 9.3% and 9.9%.

Example 11

Chitosan Acetate with 2.5 wt % as-Received Sepiolite (Based on Total Solids in the Film) with TSPP with and Without Over-Coated Estane®

Seventy-six liters of a 5.5% ChitoClear® TM-656 (Primex Inc) chitosan solution with 2.75% glacial acetic acid, 0.0248% Aliquat® 336 (Cognis Inc; added as a 4.1% masterbatch in water), 0.138% as-received sepiolite, and 0.0193% TSPP was made with water in a 20 gallon stirred tank. The sepiolite and TSPP had been first lightly stirred together in a 1-gallon jug as a 2.9% (in water) masterbatch. The sepiolite/TSPP slurry was added to the chitosan slurry, then the acetic aced was added. The solution was heated at 50° C. for 2 hrs and then heated at 70° C. for 2 hrs. The solution was circulated through an IKA High Shear Mixer Model DR2000/10 at 2800 RPM during this time before being filtered through two 10 micron bag filters in parallel. The solution was then placed in another stirred tank and pumped by positive-displacement pump through a 20 micron depth filter and then a 66 cm wide slot die onto a moving 75 micron thick PET substrate. The opening of the slot die was adjusted to give a dried film thickness of 15 microns. The film was dried in a 3-zone oven at temperatures from 70 to 130° C. as in Comparative Example 2, covered with a polyethylene sheet, and wound-up. In a second pass, after removing the cover sheet, an 11% solution of Estane® 58237 polyurethane (Lubrizol, Wickliffe, Ohio) polyurethane in tetrahydrofuran was cast over the chitosan film and dried in a 3-zone oven at 50 to 130° C. as in Comparative Example 2. The slot die opening was adjusted to give a dried film thickness of 8 microns. The film was covered by a 50 micron thick PET sheet and wound-up. The shrinkage of a piece immediately off the roll was 8.2%. After heating for 30 seconds at 160° C. while on the PET substrate, the shrinkage of two samples was 5.7% and 5.3%. An identical piece of film in which the Estane® coating had not been applied measured 6% taken immediately off the roll with no heating and 2% after heating at 160° C. for 1 minute.

Example 12

Chitosan Acetate with 2.5 wt % as-Received Sepiolite (Based on Total Solids in the Film) with TSPP, with Over-Coated Estane® Layer A chitosan film with sepiolite and an Estane® polyurethane layer was prepared as in Example 11 except that acetic was added to the chitosan slurry prior to adding the sepiolite/TSPP slurry. The film was covered by a 50 micron thick PET sheet and wound-up. The shrinkage of a piece immediately off the roll was 4.5%.

Example 13

Chitosan Acetate with 2.5 wt % Purified Sepiolite (Based on Total Solids in the Film) with Over-Coated Estane® Layer Seventy-six liters of a 5.5% ChitoClear® TM-656 (Primex Inc) chitosan solution with 2.75% glacial acetic acid, 0.0248% Aliquat® 336 (Cognis Inc; added as a 4.1% masterbatch in water), and 0.138% purified sepiolite (added as a 2.9% masterbatch slurry in water, prepared as described in Example 1) was made with water in a 20 gallon stirred tank. The solution was heated at 50° C. for 2 hrs and then heated at 70° C. for 2 hrs. The solution was circulated through an IKA High Shear Mixer Model DR2000/10 at 2800 RPM during this time before being filtered through two 10 micron bag filters in parallel. The solution was then placed in another stirred tank and pumped by positive-displacement pump through 20 micron depth filter and then a 66 cm wide slot die onto a moving 75 micron thick PET substrate. The opening of the slot die was adjusted to give a dried film thickness of 15 microns. The film was dried in a 3-zone oven at temperatures from 70° C. to 130° C. as in Comparative Example 2, covered with a polyethylene sheet, and wound-up. In a second pass, after removing the cover sheet, an 11% solution of Estane® polyurethane in tetrahydrofuran was cast over the chitosan film and dried in a 3-zone oven at 50° C. to 130° C. as in Comparative Example 2. The slot die opening was adjusted to give a dried film thickness of 8 microns. The film was covered by a 50 micron thick PET sheet and wound-up. After heating at 160° C. for 1 minute while on the PET substrate, the shrinkage was 7.3%.

Example 14

Chitosan Acetate with 2.5 wt % as-Received Sepiolite (Based on Total Solids in the Film) Without TSPP with Over-Coated Estane® Layer Seventy-six liters of a 5.5% ChitoClear® TM-656 (Primex Inc) chitosan solution with 2.75% glacial acetic acid, 0.033% Aliquat® 336 (Cognis Inc; added as a 4.1% masterbatch in water), and 0.138% as-received sepiolite (added as a lightly-stirred 2.9% masterbatch in water) was made with water in a 20 gallon stirred tank. The solution was heated at 50° C. for 2 hrs and then heated at 70° C. for 2 hrs. The solution was circulated through a Silverson High Shear Mixer Model 275 LS at 2500 RPM during this time before being filtered through two 20-inch long 20 micron polypropylene depth filters in parallel, followed by two 20 inch long 10 micron polypropylene depth filters in parallel. The solution was then placed in another stirred tank and pumped by positive-displacement pump through a 20 micron depth filter and then a 66 cm wide slot die onto a moving 75 micron thick PET substrate. The opening of the slot die was adjusted to give a dried film thickness of 13 microns. The film was dried in a 3-zone oven at temperatures from 70° C. to 160° C. as in Comparative Example 2 except with temperatures of 70° C., 100° C. and 160° C., covered with a polyethylene sheet, and wound-up. In a second pass, after removing the cover sheet, an 11% solution of Estane® polyurethane in tetrahydrofuran was cast over the chitosan film and dried in a 3-zone oven at 50° C. to 130° C. as in Comparative Example 2. The slot die opening was adjusted to give a dried film thickness of 8 microns. The film was covered by a 50 micron thick PET sheet and wound-up. The measured shrinkages immediately off the roll were 6.3%, 5.1%, 6.2%, 7.3%, and 7.9%. The shrinkage after heating while on the PET substrate at 150° C. for 30 seconds was 7.1%. The shrinkage after a similar heating at 150° C. for 45 seconds was 8.6%.

Example 15

Chitosan Acetate with 2.5 wt % as-Received Sepiolite (Based on Total Solids in the Film) Without TSPP with Over-Coated Estane® Layer A chitosan film with an Estane® layer was prepared as described in Example 14 except that ChitoClear® TM-3183 (Primex Inc) was used. instead of ChitoClear® TM-656. The measured shrinkage immediately off the roll was 7.9%. The shrinkages after heating 4 samples at 160° C. for 60 seconds while on the PET substrate were 7.5%, 6.3%, 5.5%, and 5.5%.

Example 16

Chitosan Acetate with 2.5 wt % as-Received Sepiolite (Based on Total Solids in the Film) Without TSPP with Over-Coated Estane® Layer The same procedure as in Example 15 was followed, but the chitosan resin was changed to DP-8-2-01 (Marinard Biotech). The measured shrinkage immediately off the roll was 10%. The shrinkage after heating a piece at 155° C. for 30 seconds while on the PET substrate was 5%; the shrinkage after heating a piece at 160° C. for 60 seconds while on the PET substrate was 8%.

Comparative Example 4

Laminate of Neat Chitosan Acetate Film

A 4.8% chitosan acetate solution was made by first mixing 390 g of water and 10 g acetic acid using an overhead agitator with a paddle blade. The mixture was heated to 75° C. while 20 g of ChitoClear® TM-656 (Primex Inc.) powder was added. Mixing continued for 3 hours. Upon cooling, a film was cast onto a PET sheet by using a doctor's blade with an opening of 500 microns. The film was allowed to dry and then heated in an oven at 160° C. for 1 minute. The film was removed from the PET. The thickness of this dried film was 12 microns.

Two laminate structures, 4A and 4B, were prepared as follows:
4A: Nomex® Universal Camouflage print fabric (woven, 5.7 oz/yd²) was bonded to monolithic polyurethane (PU) film (5-10 microns thick) with polyurethane adhesive dots (25% coverage).
4B: Nomex® jersey fabric (1.5 oz/yd²) was bonded to monolithic polyurethane (PU) film (5-10 microns thick) with polyurethane adhesive dots (25% coverage).
The 9 μm thick polyurethane film was TX 1540 Transport® Brand Film from Omniflex, Co. (Greenfield, Mass., USA).

One side of the chitosan acetate film was heat laminated (at 150° C., 10 psig (70 kPa), 10 s) to the polyurethane side of preformed laminate 4A. The other side of the chitosan film was then heat laminated to (at 150° C., 10 psig (70 kPa), 10 s) to the polyurethane side of preformed laminate 4B. The resulting laminate structure was a chitosan acetate film surrounded by two layers of polyurethane film and fabric. This laminate structure measured 4 inches by 4 inches. It was placed into a container of water until completely wet. After removal from the water, it was placed into an oven at 100° C. until dry. The laminate structure curled extensively into a cylindrical "cigar" shape.

Example 17

Laminate of Chitosan Acetate with 5 wt % Purified Sepiolite Film (Based on Total Solids in the Film)

The chitosan/purified sepiolite film produced in Example 2 was heat-laminated to laminate structures 4A and 4B, following the procedures of Comparative Example 4. After wetting and drying, again following the procedures of Comparative Example 4, the laminate curled only slightly along the edges.

Example 18

Laminate of Chitosan Acetate with 5 wt % as-received Sepiolite Film (Based on Total Solids in the Film)

The chitosan/as-received sepiolite film produced in Example 6 was heat-laminated to laminate structures 4A and 4B, following the procedures of Comparative Example 4. After wetting and drying, again following the procedures of Comparative Example 4, the laminate curled somewhat more than that of Example 16, but significantly less than that in Comparative Example 4.

Example 19

Effect of Heating Upon Shrinkage of Film Containing Chitosan with 2.4 wt % as-Received Sepiolite (Based on Total Solids in the Film) with TSPP A sepiolite/TSPP slurry was made by mixing 0.25 grams as-received sepiolite with 0.035 g TSPP and 7.528 g water. In a separate container, 10 g of ChitoClear® TM-656 (Primex Inc) chitosan was added to 177.2 grams of water and the sepiolite/TSPP slurry. The container was placed in a water batch, heated for 5 minutes at 50-55° C. (started after the thermocouple in the slurry read between 50° C. and 55° C.). The container was transferred from the water bath and then mixed with an IKA T-25 high-shear mixer at 13,500 RPM for 5 minutes. Five grams of acetic acid were then added and the slurry was mixed again for 5 minutes. The slurry was allowed to degas overnight. A film was cast from this chitosan/sepiolite slurry onto a PET sheet by using a doctor's blade with an opening of 380 microns. The film was dried as in Comparative Example 1. The calculated sepiolite concentration of this dried 10 micron-thick film was 2.4 wt %. Pieces were then heated in an oven for 4 minutes at either 140° C. or 160° C. temperatures and the shrinkages of multiple pieces of each were measured. After the 140° C. heating, the shrinkages were 6.1%, 6.8%, and 7.0%. After the 160° C. heating, the shrinkages were 3.9%, 3.9%, 3.5%, and 2.3%. These results are given in Table 1.

Example 20

Effect of Heating Upon Shrinkage of Film Containing Chitosan with 4.8 wt % as-Received Sepiolite (Based on Total Solids in the Film) with TSPP A sepiolite/TSPP slurry was made by mixing 0.50 g as-received sepiolite with 0.070 g TSPP and 15.06 g water. In a separate container, 10 g of ChitoClear® TM-656 (Primex Inc) chitosan was added to 169.38 grams of water and the sepiolite/TSPP slurry. The container was placed in a water bath, heated for 5 minutes at 50-55° C. (started after the thermocouple in the slurry read between 50° C. and 55° C.). The container was transferred from the water bath and then mixed with an IKA T-25 high-shear mixer at 13,500 RPM for 5 minutes. Five grams of acetic acid were then added and the slurry was mixed again for 5 minutes. The slurry was allowed to degas overnight. A film was cast from this chitosan/sepiolite slurry onto a PET sheet by using a doctor's blade with an opening of 380 microns. The film was dried as in Comparative Example 1. The calculated sepiolite concentration of this dried 12 micron-thick film was 4.8 wt %. Pieces were then heated in an oven for 4 minutes at either 140° C. or 160° C. temperatures and the shrinkages of multiple pieces of each were measured. After the 140° C. heating, the shrinkages were 6.8%, 6.9%, and 8.0%. After the 160° C. heating, the shrinkages were 2.6%, 2.4%, and 1.9%. These results are given in Table 1.

TABLE 1

Chitosan/sepiolite film shrinkage after different heat treatments

| % Sepiolite | Baking temp (° C.) | % shrinkage | Av shrinkage (%) | Std. Dev (%) |
|---|---|---|---|---|
| 2.4 | 140 | 6.1, 6.8, 7 | 6.6 | 0.5 |
| 2.4 | 160 | 3.9, 3.9, 3.5, 2.3 | 3.4 | 0.8 |
| 4.8 | 140 | 6.8, 6.9, 8 | 7.2 | 0.7 |
| 4.8 | 160 | 2.6, 2.4, 1.9 | 2.3 | 0.4 |

Comparative Example 5

Effect of Heating Upon Shrinkage: Neat Chitosan

Eleven g of Chitoclear® TM3183 (Primex) was mixed with 165 g water in a container. The slurry was stirred for 15 minutes with a mechanical stirrer in a 60° C. water bath. Then, 5.5 g fresh acetic acid and 18.4 g water was added and the slurry was stirred for 60 minutes at 60° C. The slurry was allowed to degas overnight. A film was cast from this chitosan solution onto a PET sheet by using a doctor's blade with an opening of 457 microns. The film was allowed to dry by heating at 110° C. for 30 minutes. Pieces were then heated in an oven for 4 minutes at 160° C. temperature and the shrinkage of each 15 micron-thick film was measured. Shrinkage of the samples was 10.3%, 11.7%, 10.4%, 11.4%.

Example 20

Moisture Vapor Transmission and DMMP Transmission

A film of chitosan and 4.8% purified sepiolite was prepared as described in Example 2 except that 1% isopropanol was added to the casting solution to aid wetting onto the PET sheet that it was cast upon. In addition, a 30 mil opening was used, so the film was 17 microns thick. The shrinkage was measured at 5%. MVTR was measured as described in General Methods on four samples of the film and the average MVTR was 34.9 with a standard deviation of 8.7. Permeation of DMMP was measured as described in General Methods on three samples of the film. No DMMP was detected in the water.

What is claimed is:

1. A film, having an original length, comprising at least about 51 weight percent chitosan and a needle-structured sepiolite clay in an amount from about 0.5 weight percent to about 8 weight percent, provided that when the needle structured sepiolite clay is present in an amount of about 1% or less, the clay is purified prior to including in the chitosan film, and wherein the needle structured sepiolite clay is substantially dispersed.

2. The film of claim 1 wherein shrinkage of the film following contact with water and drying is less than about 8% of the original length.

3. The film of claim 1 further comprising one or more members selected from the group consisting of starch, cellulose, synthetic polymers, crosslinking agents, glass spheres, glass bubbles, laponite, bentonite, illite, chlorite, kaolinite, mica, talc, vermiculite, sodium montmorillonite, flame retardants, plasticizers, tougheners, and stabilizers.

4. The film of claim 1 wherein the substantially dispersed needle structured clay has greater than about 50 wt % of particles, which are needle shaped structures, existing as individual particles.

5. A structure comprising the film of claim 1 and at least one layer of fabric.

6. The structure according to claim 5 wherein said structure is a laminate.

7. The structure of claim 5 further comprising an outer shell, and optionally an inner liner, each independently comprising at least one member of the group consisting of woven fabric, nonwoven fabric, films, and microporous membranes.

8. The structure according to claim 5 wherein the structure has a Moisture Vapor Transport Rate that is at least $2 \text{ kg/m}^2/24 \text{ h}$.

9. A finished article incorporating a laminate comprising the film of claim 1 and at least one layer of fabric.

10. The finished article according to claim 9 wherein said article is selected from the group consisting of items of apparel, shelters, and protective covers.

11. A method for reducing the shrinkage of a continuous chitosan film having an original length, comprising the step: including in the chitosan film a needle structured sepiolite clay in an amount from about 0.5 weight percent to about 8 weight percent based on the weight of the film, provided that, when the needle structured sepiolite clay is present in an amount of about 1% or less, the clay is purified prior to including the clay in the chitosan film, and wherein the needle structured sepiolite clay is substantially dispersed.

12. A method according to claim 11 wherein shrinkage of the film following contact with water and drying is less than about 8% of the original length.

13. A method according to claim 11 wherein greater than about 50 weight percent of the clay is present in the form of individual particles.

* * * * *